A. BENNER.
VALVE CONSTRUCTION.
APPLICATION FILED DEC. 4, 1909.

968,916.

Patented Aug. 30, 1910.

Witnesses
O. B. Baenziger
C. C. Jennings

Inventor
Andrew Benner
Parker & Burton
Attorneys

UNITED STATES PATENT OFFICE.

ANDREW BENNER, OF DETROIT, MICHIGAN.

VALVE CONSTRUCTION.

968,916.  Specification of Letters Patent.  Patented Aug. 30, 1910.

Application filed December 4, 1909. Serial No. 531,295.

*To all whom it may concern:*

Be it known that I, ANDREW BENNER, a citizen of the United States, residing at Detroit, county of Wayne, State of Michigan, have invented a certain new and useful Improvement in Valve Construction, and declare the following to be a full, clear, and exact description of the same, such as will enable others skilled in the art to which it pertains to make and use the same, reference being had to the accompanying drawings, which form a part of this specification.

This invention relates to valves.

It has for its object an improved rotating valve and seat therefor, adapted to be automatically shifted or rotated on its seat by the fluid passing through the valve whereby the wear is distributed evenly, and the durability of the valve structure increased.

Figure 1:
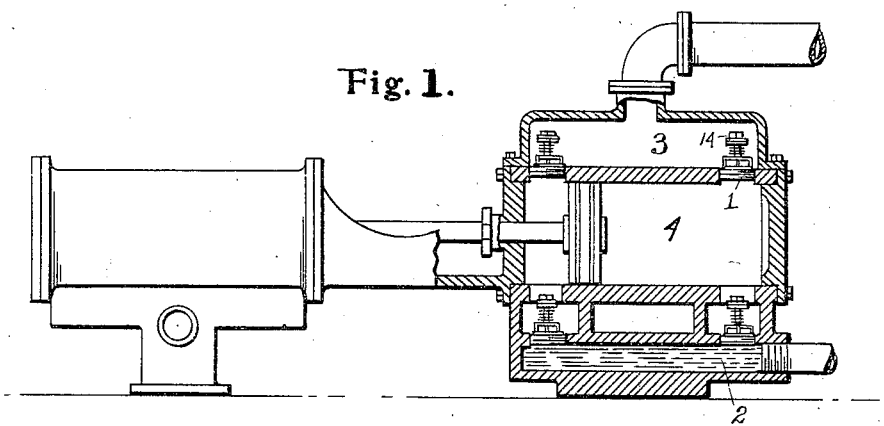
Figure 2:
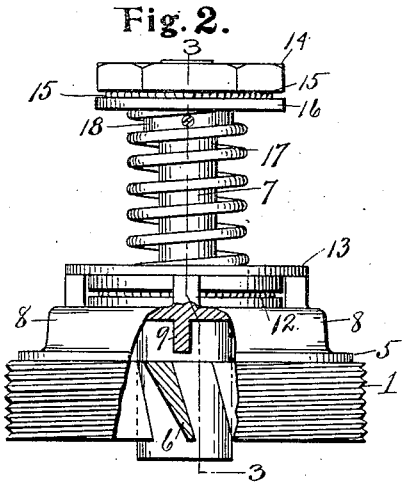
Figure 3:
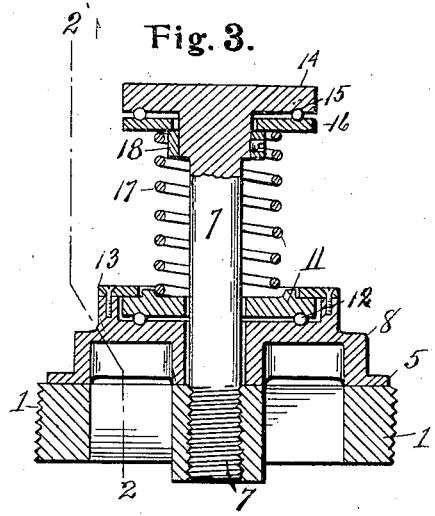
Figure 4:
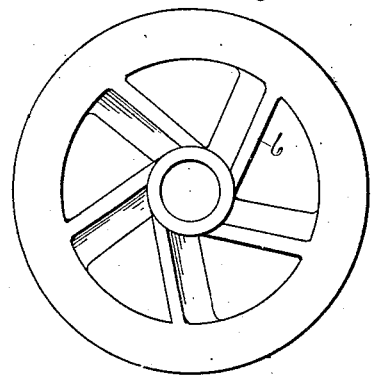
Figure 5:
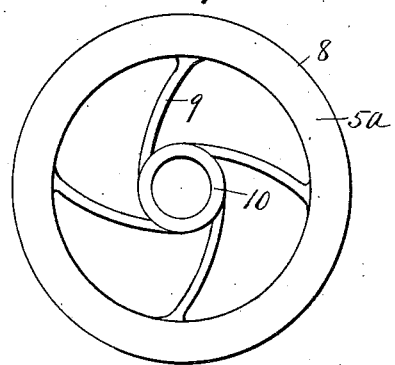

In the drawings:—Figure 1, indicates the location of the valve. Fig. 2, is a side elevation partly in section. Fig. 3, is a vertical cross section. Fig. 4, is an inverted plan view of the spider in the valve seat. Fig. 5, is an inverted plan view of the valve.

The valve is peculiarly adapted for use in reciprocating pumps as is indicated in Fig. 1, where it acts as a check valve when used on the inflow side of the pump, and as a check valve to prevent the returning into the pump of fluid that has once been forced from it. The valve base 1 is provided with threads and adapted to be screwed into any suitable shell, as for example, in the walls of the chamber 2 at the bottom of the pump shown in Fig. 1, and in the walls of the common chamber 3, between the chamber 3 and the chamber 4 of the pump. The base 1 consists essentially of a ring with a tabular upper surface 5 on which the valve proper seats, and with a spider having several arms 6 which are provided with faces inclined to the axis of the ring, and at the hub or meeting of the spider 6 provision is made for the insertion and securing of the stud 7 on which the valve 8 is mounted. The valve 8 is chambered on its under side and provided with a seating face $5^a$, and within the chamber are vanes 9, preferably somewhat curved, leaving the hub part 10 substantially tangential to the hub, and facing with a slight curvature to the rim on which is the valve face $5^a$. The back of the valve, which in use is the upper side of the valve, is chambered for the reception of the bearing plate 11, and within the chamber is a race for anti-friction balls 12. The ring 13 engages over the outer face of the bearing disk 11 and prevents the disk from leaving the chamber and its position of bearing against the balls. The post 7 supports at its upper end a thrust block 14 provided on its under side with a race for anti-friction balls 15. A thrust disk 16 engages under the balls, and the disk 16 and the disk 11 are held in their respective positions of thrust against the balls 12 and 15 by a spring 17. Preferably, the disk 16 is made as a ring which engages around a depending neck 18 that extends from the thrust block 14 down along the post 7.

What I claim is:—

In a valve, in combination with a conduit ring having an inclosed spider with guide faces thereon inclined to the axis of the ring and with a valve seat on one face of said ring, a valve adapted to seat on said valve seat and provided with vanes on its under surface, a post held centrally with respect to said valve seat, a thrust block supported by said post, bearing disks engaging between the thrust block and the valve, anti-friction balls interposed between the bearing disks, and a thrust block on one side and a bearing disk and valve on the opposite side and a spring holding said disks in contact with the balls, substantially as described.

In testimony whereof, I sign this specification in the presence of two witnesses.

ANDREW BENNER.

Witnesses:
CHARLES F. BURTON,
VIRGINIA C. SPRATT.